United States Patent

[11] 3,548,128

| [72] | Inventor | Palmer B. Willett<br>P. O. Box 1025, Tallulah, La. 71282 |
|---|---|---|
| [21] | Appl. No. | 840,974 |
| [22] | Filed | July 11, 1969 |
| [45] | Patented | Dec. 15, 1970 |

[54] ADJUSTABLE STEERING WHEEL
14 Claims, 6 Drawing Figs.

[52] U.S. Cl. ..................................... 200/61.57;
74/552, 74/493
[51] Int. Cl. ..................................... H01h 9/00;
B62d 1/18
[50] Field of Search ........................... 200/61.54,
61.55, 61.56, 61.57; 74/552, 493

[56] References Cited
UNITED STATES PATENTS

| 1,226,411 | 5/1917 | Thomas | 74/493 |
| 2,488,159 | 11/1949 | Becker | 74/552 |
| 2,563,339 | 8/1951 | Kellog | 74/552 |

*Primary Examiner*—Robert K. Schaefer
*Assistant Examiner*—M. Ginsburg
*Attorney*—Berman, Davidson and Berman ABSTRACT: A large diameter adjustable steering wheel comprising an outer tubular rotatable member having a steering wheel secured thereto, and an inner tubular member disposed therein and rotatable with the outer tubular member and means operatively connected to said inner and outer tubular members for adjusting the overall length of the steering column, with a plurality of circumferentially spaced gear members disposed partially within said inner tubular member and operatively connected to a steering shaft of a vehicle and a large hollow stationary cylindrical member disposed within said inner tubular member upon which are disposed a plurality of vehicle instruments.

INVENTOR.
PALMER B. WILLETT,
BY
Berman, Davidson & Berman,
ATTORNEYS.

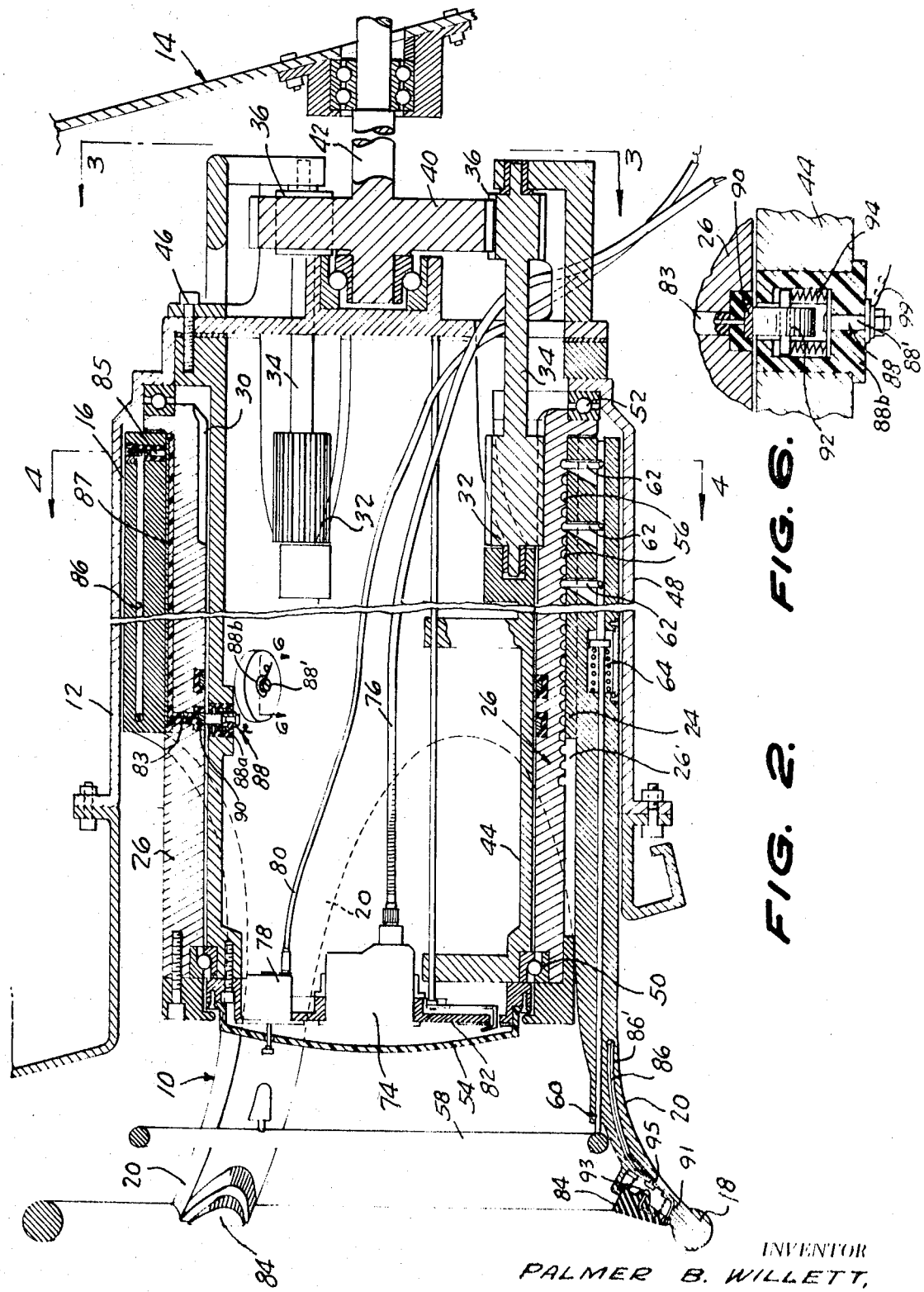

3,548,128

ADJUSTABLE STEERING WHEEL

The present invention relates to a steering column for a vehicle and a steering wheel comprising a large diameter hollow cylindrical member operatively connected to the vehicle's steering column and within which cylindrical member is disposed all of the instruments normally found on the dashboard of a vehicle.

It is an object of the present invention to provide a steering wheel that is adjustable with respect to its overall length and in which the vehicle instruments are disposed within an inner tubular column disposed within the steering wheel column.

It is another object of the present invention to provide an adjustable steering column that can be moved substantially inwardly toward the dashboard of a car, a predetermined distance.

It is yet another object of the present invention to provide a steering column having a longitudinally adjustable steering wheel to permit easy escape and exit and entrance into the seat of the vehicle.

It is a further object of the present invention to provide a large diameter cylindrical steering wheel in which the vehicle instruments are disposed centrally of the steering wheel within an inner stationary cylindrical member so that the driver can watch the instruments more effectively while at the same time maintaining a more safe view of the road upon which he is driving.

Various other objects and advantages of the present invention will be readily apparent from the following detailed description when considered in connection with the accompanying drawings forming a part thereof, and in which:

FIG. 2 is an enlarged section of the steering device of the present invention taken along the lines 2-2 of FIG. 1.

FIG. 6 is a fragmentary enlarged detailed view of the means connecting the horn to the battery of the vehicle.

Figure 1:
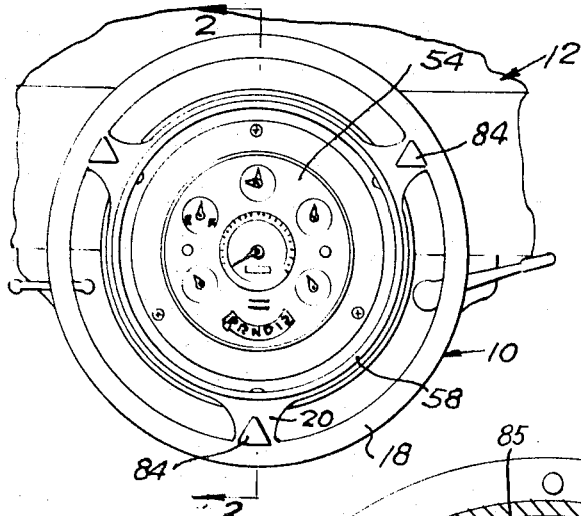
FIG. 1 is a view of the steering column device embodied in the present invention looking at it from a top plan view directly behind the steering wheel.

Referring to the drawings, the reference numeral 10 generally designates the steering device of the present invention provided with a dashboard generally designated 12 and a fire wall generally designated 14. The steering device is provided with a large diameter tubular member 16 with a steering wheel 18 on the end thereof and three circumferentially spaced webs 20 terminating in their lower end in the tubular cylindrical section of the column.

Figure 4:
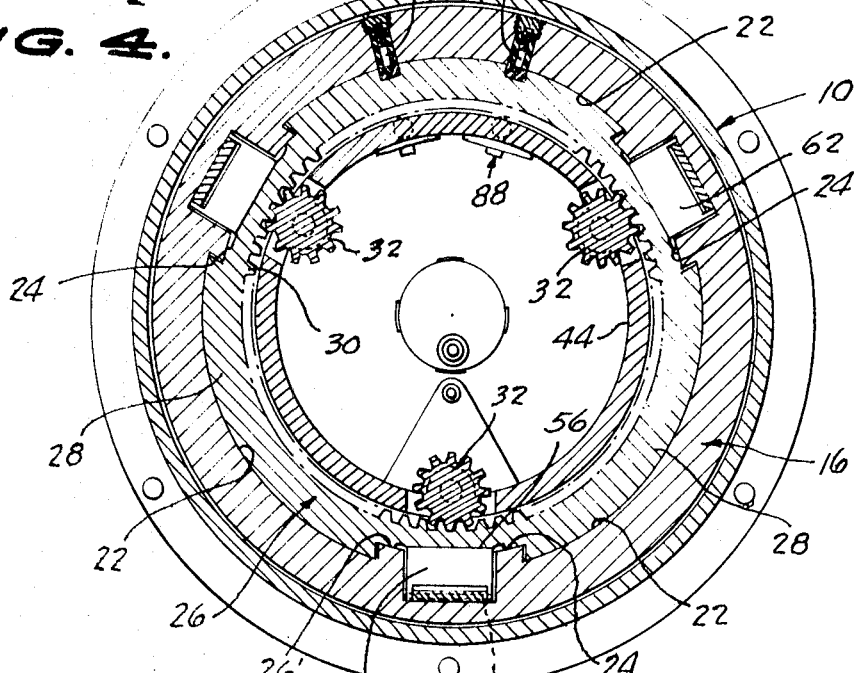
FIG. 4 is a sectional view taken along the lines 4-4 of FIG. 2.

The tubular member 16, as best seen in FIG. 4, is provided with longitudinally extending recesses or grooves 22 on its inner circumference and three longitudinally extending splines 24 thereon.

An inner tubular or cylindrical member 26 is disposed within the outer member 16 and is provided with alternate corresponding grooves 26' and splines 28 that mate with the splines 24 and grooves 22 of the outer cylindrical member. This inner tubular member 26 is adapted to be turned or rotated with the outer tubular member 16, and the outer member 16 is adapted to be slid or moved axially with respect to the inner member as hereinafter explained.

Figure 3:
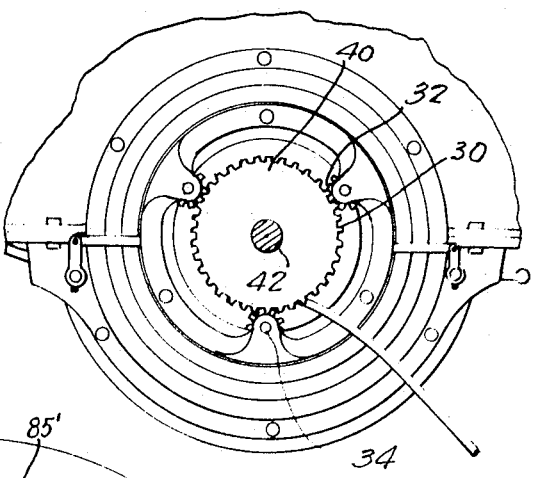
FIG. 3 is a sectional view taken along the lines 3-3 of FIG. 2.

The inner surface of the inner member 26 is provided with gear teeth indicated at 30 which mesh with three circumferentially spaced gear wheels 32, each carried on shaft 34 journaled at its ends, as best seen in FIG. 2. The opposite ends of the shaft 34 are provided with gear wheels 36 which mesh with the gear teeth on centrally disposed gear wheel 40, as best seen in FIGS. 2 and 3. The gear wheel 40 is disposed on a journaled shaft 42 connected to the conventional steering mechanism of a vehicle.

An inner hollow stationary cylindrical member 44 is disposed within the inner cylindrical member 26. The stationary cylindrical member 44 is secured by a bolt 46 to the dashboard 12 and the lower portion 48 of the dashboard while the cylindrical member 26 is journaled in ball bearings 50 and 52 for rotation with respect to the fixed or stationary cylindrical member or housing 44. The member 44 is provided with a cover or a glass plate 54 for housing the instruments of the vehicle. As best seen in FIG. 1, the instrument cover plate 54 is disposed centrally of the steering wheel 18 so that it can be clearly seen through the center of the steering wheel.

Figure 5:
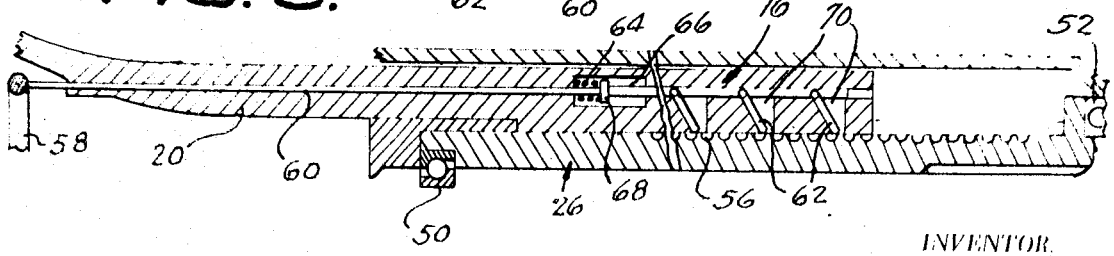
FIG. 5 is a fragmentary sectional view illustrating the means for adjusting the overall length of the steering column.

The inner rotatable member 26, as best seen in FIG. 5, is provided with a plurality of longitudinally spaced notches or grooves 56 therein, and the outer member 16 is provided with a ring or wheel 58 disposed within the steering wheel 18, as best seen in FIG. 2, and having three longitudinal rods or straps 60 which extend through the member 16 to a point adjacent the notches or grooves 56. The inner ends of the straps 60 are provided with latch rods or bars 62 connected by pins to the straps 60 and which latch bars 62 are adapted to fit into the notches or grooves 56. When the ring 58 and the latch bars 62 are disposed in a vertical position, as shown in FIG. 2, latch bars 62 are disposed in the notches 56 and there is no relative longitudinal movement between the ring 58 and the inner and outer members 26 and 16, respectively, or the steering wheel 18. The straps 60 are provided with coiled springs 64 thereon disposed in a bore 66 and bearing against abutments 68 on the straps. The force of springs 64 normally urges the straps 60 toward the right, looking at FIG. 2 and keeps the latch bars 62 disposed in the notches 56 so that there is no relative axial movement between the inner and outer members 26 and 16.

When it is desired to change the overall length of the steering column to increase its length and pull it outwardly or in a direction to the left, when looking at FIG. 2, it is only necessary to pull the ring 58 to the left toward the steering wheel 18, or toward the driver. This action will cause the coil springs 64 to be compressed, as best seen in FIG. 5, and the latch bars 62 to pivot to approximately a 45° angle in their cutouts or recesses 70. At this time the bars or rods 62 are raised completely out of the notches 56 so that the inner and outer members 16 and 26 respectively can be slid or moved longitudinally of each other. Referring to FIG. 2, it will be seen that in the position shown therein the inner and outer members are disposed so that the steering wheel 18 is in its most retracted position, while referring to the position of the steering wheel and the inner and outer members shown in FIG. 5, it will be noted that the outer member 16 is in an extended position, or in a position wherein the overall length of the steering column is greater than in the position shown in FIG. 2.

Releasing ring 58 permits springs 64 to move the rods 60 so as to reengage latch bars 62 in notches 56 and thus hold the steering column in its adjusted position.

Referring to FIG. 2, it will be noted that the dashboard which in effect is the instrument panel disposed within the stationary inner cylindrical member or column 44, is provided with a speedometer 74 with a cable 76 that extends therethrough and out to the usual or conventional speedometer assembly through the open end of the member 44 adjacent the shaft 34. The instrument board within the stationary tubular member 44 is also provided with a clock 78 having an electric conducting cable 80 also extending out of the front end thereof for connection to the battery. The dashboard is also provided with the instrument panel 82 disposed under the transparent cover plate 54 which can also be provided with the usual type of instruments used in a vehicle.

With respect to the vehicle horn, the three webs 20 are provided with horn buttons 84, each of which has an electric cable 86 that leads ultimately to the terminal 88 insulated by grommet 88a, see FIG. 6, of the member 44, from where it is connected to the vehicle battery. The other side 91 of each horn switch 84 is connected by a similar cable 86' which leads to a second terminal 88' which is grounded. When horn button 84 is depressed, its contact point 93 engages contact point 95 of cable 86. The end of cable 86 is maintained in contact with the battery and the insulated terminal 88 through electric conducting ring 90, see FIG. 6, on the inner surface of the member 26 which makes contact with a roller 92 disposed in a recess in member 44 and provided with a biasing spring 94 to maintain contact as the members 16 and 26 are rotated with respect to the stationary inner cylindrical member 44. Each cable 86 is connected by spring loaded brush 85 to a metal strip 87 insulatedly seated in a longitudinal groove of cylinder 26. The terminal portion of the strip 87 is connected to the ring 90 by cable 83 and terminal 88 is connected to the ring by roller 92. A wire 99 connects terminal 88 to the battery. The grounded circuit connection to each of the horns 84 is made by similar parts having the same reference numerals except primed. The described structure permits longitudinal adjustment of the wheel 18 and carrying member 16, and rotation of parts 16 and 26 with respect to cylinder 44 while still maintaining the electrical circuits for each of the three horn buttons 84.

Thus from the foregoing description it is apparent that the present invention provides a novel steering device for a vehicle in which the instruments usually found on the dashboard of a vehicle are disposed within a central stationary column or tubular member so as to provide a safety device for the driver of a vehicle where he can observe all his necessary instruments within the steering wheel.

It is further apparent from the foregoing description that the present invention provides a novel adjustable steering wheel in which the turnable or rotatable outer sleeves of the device are provided with adjustable means so that the steering wheel can be retracted toward the dashboard and can be pulled out therefrom so as to change the overall length of the steering wheel for safety reasons and to permit parties to get in and out of the driver's seat.

A further advantage of the steering device of the present invention is that it contains no center post, thus presenting a safety margin over all known steering mechanisms in that kinetic energy exerted on the steering wheel is transmitted to the steering shaft 42 through the large cross-sectional area of the inner and outer tubular members and connected parts, thus spreading the energy force rather than concentrating it in a single, vulnerable post member. The three spaced webs 20 containing the horn buttons 84 define three large parabolic spaces which geometrically serve to separate and divide sudden forces applied to the wheel in transmitting such forces to the large tubular outer member.

Although a certain specific embodiment of the invention has been shown and described, it is obvious that many modifications thereof are possible. The invention, therefore, is not intended to be restricted to the exact showing of the drawings and description thereof, but is considered to include reasonable and obvious equivalents.

I claim:

1. A steering wheel device comprising an outer tubular member with a steering wheel disposed on one end thereof, an inner tubular member connected to said outer tubular member for rotation therewith, said outer member being longitudinally slidable of said inner member to vary the overall length of said steering wheel device; means normally clamping said members together to prevent relative slidable movement therebetween, vehicle steering means connected to said inner member, and a large diameter stationary tubular member disposed within said inner member for carrying vehicle instruments therein and at one end thereof.

2. The device of claim 1 wherein said clamping means includes a plurality of straps with radially extending latch bar means thereon operatively connected to said outer member, and said inner member is provided with notch means therein for receiving said bar means to prevent slidable movement between said members.

3. The device of claim 2 wherein said straps are connected to a concentric ring disposed below said steering wheel, and biasing means normally urge said straps in a direction away from said steering wheel to maintain said latch bar means in said notch means.

4. The device of claim 2 wherein said inner and outer members are provided with spline means connecting them together for rotation with each other.

5. The device of claim 4 wherein said stationary tubular member is fixed to a dashboard means of a vehicle.

6. The device of claim 5 wherein said stationary member is provided with plate means at its upper end for carrying said instruments thereon and is open ended at its other end to permit cables to be passed therethrough to other parts of the vehicle.

7. The device of claim 6 wherein ball bearing means are disposed on said stationary member and dashboard means and said inner member is journaled therein.

8. The device of claim 7 wherein said inner tubular member is provided with a ring gear on its inner surface, and said steering means includes a plurality of journaled shafts with gear wheels fixed thereon at one end thereof and which mesh with said ring gear.

9. The device of claim 8 wherein said shafts are disposed partially within said stationary member and extend out the open end thereof, other gear wheels being fixed at the other ends of the shafts.

10. The device of claim 9 wherein said steering means includes a concentrically disposed shaft in alignment with the longitudinally disposed axis of said stationary member and having a gear wheel which meshes with said other gear wheels fixed on said plurality of journaled shafts.

11. The device of claim 6 wherein said steering wheel is provided with circumferential webs with horn buttons thereon, each of said horn buttons activating a switch with two electrical contact points and means normally biasing said points away from each other.

12. The device of claim 11 wherein said webs have a pair of horn electrical cables connected to said contact points of said switches and extending therethrough to the lower portion of said outer member, and conductor brushes are connected to said cables and disposed on the inner surface of said outer member, said inner member having a pair of longitudinal groove means, an insulated longitudinal metal strip disposed in each of said groove means in contact with each of said brushes, an insulated electrical cable in contact with said strip and extending through said inner member, and insulated electrical conducting rings disposed on the inner surface of said inner member for connection to a vehicle battery and around.

13. The device of claim 12 wherein said stationary member is provided with electrical conducting roller means engaging said conducting rings to provide an electrical path into the interior of said stationary member for connection of the horn to the vehicle battery and ground.

14. The device of claim 13 wherein said conducting roller means has biasing springs keeping it in contact with said ring, and said brush has biasing springs keeping it in contact with said strip.